United States Patent
Hatfield

[19]

[11] Patent Number: 6,082,306
[45] Date of Patent: Jul. 4, 2000

[54] ANIMAL SAFETY STANCHION WITH STANCHION BUMPER

[76] Inventor: John Hatfield, 1823 Shoestring Rd., Gooding, Id. 83330

[21] Appl. No.: 09/072,430

[22] Filed: May 4, 1998

[51] Int. Cl.[7] .................................................. A01K 1/06
[52] U.S. Cl. ..................... 119/524; 119/731; 119/736; 119/738; 119/740; 119/743; 119/750
[58] Field of Search ...................................... 119/524, 738, 119/739, 729, 730, 731, 735, 736, 740, 741, 742, 743, 744, 750, 904

[56] References Cited

U.S. PATENT DOCUMENTS

| | | | |
|---|---|---|---|
| Re. 32,728 | 8/1988 | Albers, Sr. | 119/148 |
| Re. 34,232 | 4/1993 | Da Silveira | 119/148 |
| 4,037,566 | 7/1977 | Albers | 119/147 |
| 4,051,813 | 10/1977 | Albers | 119/148 |
| 4,055,149 | 10/1977 | Haiges | 119/147 |
| 4,116,166 | 9/1978 | Gofflot . | |
| 4,185,592 | 1/1980 | Albers, Sr. | 119/148 |
| 4,377,131 | 3/1983 | Vandenberg et al. | 119/148 |
| 4,457,265 | 7/1984 | Anderson | 119/148 |
| 4,476,815 | 10/1984 | Albers, Sr. | 119/147 |
| 4,495,897 | 1/1985 | Albers, Sr. | 119/148 |
| 4,574,741 | 3/1986 | Mahler . | |
| 4,579,084 | 4/1986 | McCan et al. . | |
| 4,867,105 | 9/1989 | Hatfield | 119/148 |
| 4,930,452 | 6/1990 | Da Silveira | 119/148 |
| 4,976,224 | 12/1990 | Hatfield . | |
| 5,109,802 | 5/1992 | Priefert . | |
| 5,226,387 | 7/1993 | Anderson | 119/148 |
| 5,289,798 | 3/1994 | Lock | 119/58 |
| 5,309,869 | 5/1994 | Albers, Jr. | 119/735 |
| 5,373,813 | 12/1994 | Da Silveira | 119/740 |
| 5,392,731 | 2/1995 | Hoppman et al. . | |
| 5,564,368 | 10/1996 | Hepp et al. | 119/740 |
| 5,694,887 | 12/1997 | Vandenberg . | |

FOREIGN PATENT DOCUMENTS

| | | | |
|---|---|---|---|
| 2 242 929 | 5/1975 | France . | |
| 2 332 703 | 7/1977 | France . | |
| 24 46 026 | 4/1976 | Germany . | |
| 26 32 057 | 1/1978 | Germany . | |
| 28 18 513 | 11/1979 | Germany . | |
| 29 11 431 | 9/1980 | Germany | A01K 1/06 |
| 646960 | 2/1979 | Russian Federation | A01K 1/06 |

*Primary Examiner*—Peter M. Poon
*Assistant Examiner*—Yvonne R. Abbott
*Attorney, Agent, or Firm*—Frank J. Dykas

[57] ABSTRACT

A stanchion bumper is provided for use with a cattle stanchion having a head opening typically defined by a stationary, vertically-oriented stanchion and a pivotal release stanchion which, when tilted in one direction, enlarges the upper part of the opening so that the animal can insert its head through the opening, a closed position where the pivotal stanchion is vertical and defines a head opening through which an animal cannot withdraw its head, and a downed animal position wherein an enlarged lower opening exists so that a downed animal can withdraw its head. The stanchion bumper is positioned below the pivot point of the release stanchion, such that the lower portion of the release stanchion will engage the stanchion bumper when the animal inadvertently moves the release stanchion past the closed position toward the downed animal position.

11 Claims, 6 Drawing Sheets

ANIMAL SAFETY STANCHION WITH STANCHION BUMPER

BACKGROUND OF THE INVENTION

1. Technical Field

This invention relates to animal stanchions, and more particularly to a locking cattle stanchion having a stanchion bumper precluding unintentional repositioning of the release stanchion to the downed cow position.

2. Background

Safety stanchions to hold and selectively release cattle during feeding, milking, veterinary care, pregnancy testing and even calving are very commonly used throughout the United States. They are found in feed lots, ranching operations, dairies and virtually any other activity where cattle and dairy cows are tended to. They have some common characteristics, in that they are usually fabricated in long strings of individual stanchions connected between top and bottom rails and set in concrete which are used to separate the animals from the feed bunker.

In the typical prior art cattle stanchion being manufactured today, the head opening for the animal is typically defined between a stationary, vertically-oriented stanchion and a pivotal release stanchion, which, when tilted in one direction, enlarges the upper part of the opening so that the animal can put its head through. As the animal lowers its head to reach the feed, the pivotal release stanchion pivots to a more vertical position where, if desired, it can be automatically latched in place to define the closed position. In the closed position, the animal cannot withdraw its head from the stanchion and is effectively held in place. If the animal becomes distressed and falls down, or is knocked down by an adjacent animal, the stanchion can be individually released to a downed animal position by releasing the latch on the release stanchion and allowing it to pivot in the opposite direction to enlarge the opening in the lower portion of the head opening so that the downed animal can remove its head.

These long strings of cattle stanchions serve many useful functions which include, but are not limited to, permitting each animal equal access to the feed bunker for equal portion sizing, for holding the animals close together where they are most comfortable, since they are instinctually herd animals, and to immobilize the animal for veterinary care, such as dehorning, vaccinating, pregnancy testing, and a host of other types of uses.

Control of the latch mechanism for the release stanchion in the prior art has traditionally been accomplished by means of a control rod, which is mounted atop the top rail. In the prior art, the control rod contains one of two cooperating parts of a latch mechanism for the release stanchion, with the other cooperating part of the latch mechanism attached to the top of the pivotal release stanchion. The typical prior art safety stanchion assembly contains a control rod which provides for the following lock and release functions: A locked open position where the released stanchion automatically falls to the open position when the upper portion of its opening is enlarged, to enable an animal to insert its head and then lower its head, swinging the release stanchion out of the way as it reaches for feed; an open to automatic closed position where when the animal lowers its head, the release stanchion locks in place in the closed position to automatically lock the animal in the stanchion; a manually operable downed animal position wherein the rancher or dairyman can release an individual animal that has fallen down by manually pivoting the release stanchion to the downed animal position; and a locked close position to lock all of the stanchions in a closed position to either keep the animals from inserting their heads through the stanchion, or to keep all of the animals contained within the stanchions.

In the prior art, the typical stanchion is designed to have the pivotal release stanchion fall, by gravity, into the open position where the upper part of the opening is enlarged so that a standing animal can put its head through, but when the stanchions are locked open, and the animal inserts its head through the enlarged upper opening and lowers it forcefully, or perhaps moves its lowered head from side to side, it can swing the pivotal stanchion to the downed animal position where the lower portion of the opening is enlarged. In the prior art stanchions, if this occurs, the pivotal stanchion will often times remain, by force of gravity, in the downed animal position. Many animals then learn to withdraw their heads from the lowered position, thus leaving the stanchion in the downed animal position, from which it has to be manually reset by the operator.

It is not unusual for an operator to routinely leave the row of cattle stanchions in the locked open position. If there is no particular need at a particular feeding to lock them in, leaving them in the locked open position makes sense, since the cattle stanchion still serves the purpose of portion sizing and preventing the spoliation of the cattle feed because the animals still have to stick their heads through the openings to reach the feed bunker. However, some animals will learn to insert their heads through the upper opening, and as they lower their heads to knock the pivotal cattle stanchion to the downed animal position while feeding. If the operator then decides, while the cattle are feeding, to lock them in for whatever reason and repositions the latch mechanism control to the automatic closed position, the operator will not catch the animals who have moved the stanchions to the downed animal position.

Both of these situations, namely resetting the pivotal stanchions that have been repositioned by the animal to the downed animal position and left in that configuration when the animal withdraws its head, and the situation where the animal repositions the pivotal stanchion to the downed animal position before the operator has the chance to shift to an automatic closed mode, have been perennial problems for which there has been no solution.

DISCLOSURE OF INVENTION

These objects are achieved by use of a stanchion bumper in conjunction with a typical prior art animal stanchion formed of a generally vertically oriented fixed stanchion, a pivotal release stanchion, a fulcrum rail and fulcrum strut, which together pivotally support the release stanchion by means of a pivot pin. The stanchion bumper is attached to the support structure for the release stanchion below the pivot point, and is formed of a resilient bumper pad. It is positioned to be engaged by the lower portion of the release stanchion when it is pivoted beyond the closed position towards the downed animal position.

The stanchion bumper, when engaged with the lower portion of the release stanchion imparts a recoil force to the release stanchion and pushes the release stanchion back toward the closed position.

Thus, as the animal lowers its head and pushes the release stanchion toward the downed animal position, the stanchion bumper keeps pressure against the release stanchion to hold it closer to the vertical orientation of the closed position, thus precluding the animal from withdrawing its head when it is lowered and thereby forcing the animal to raise its head to push the release stanchion back to the open position before the animal can withdraw.

The stanchion bumper is made of resilient material and configured such that an operator can still override the force imparted by the stanchion bumper to push the release stanchion into the downed animal position to release an animal that has truly fallen.

BEST MODE FOR CARRYING OUT INVENTION

Figure 1:
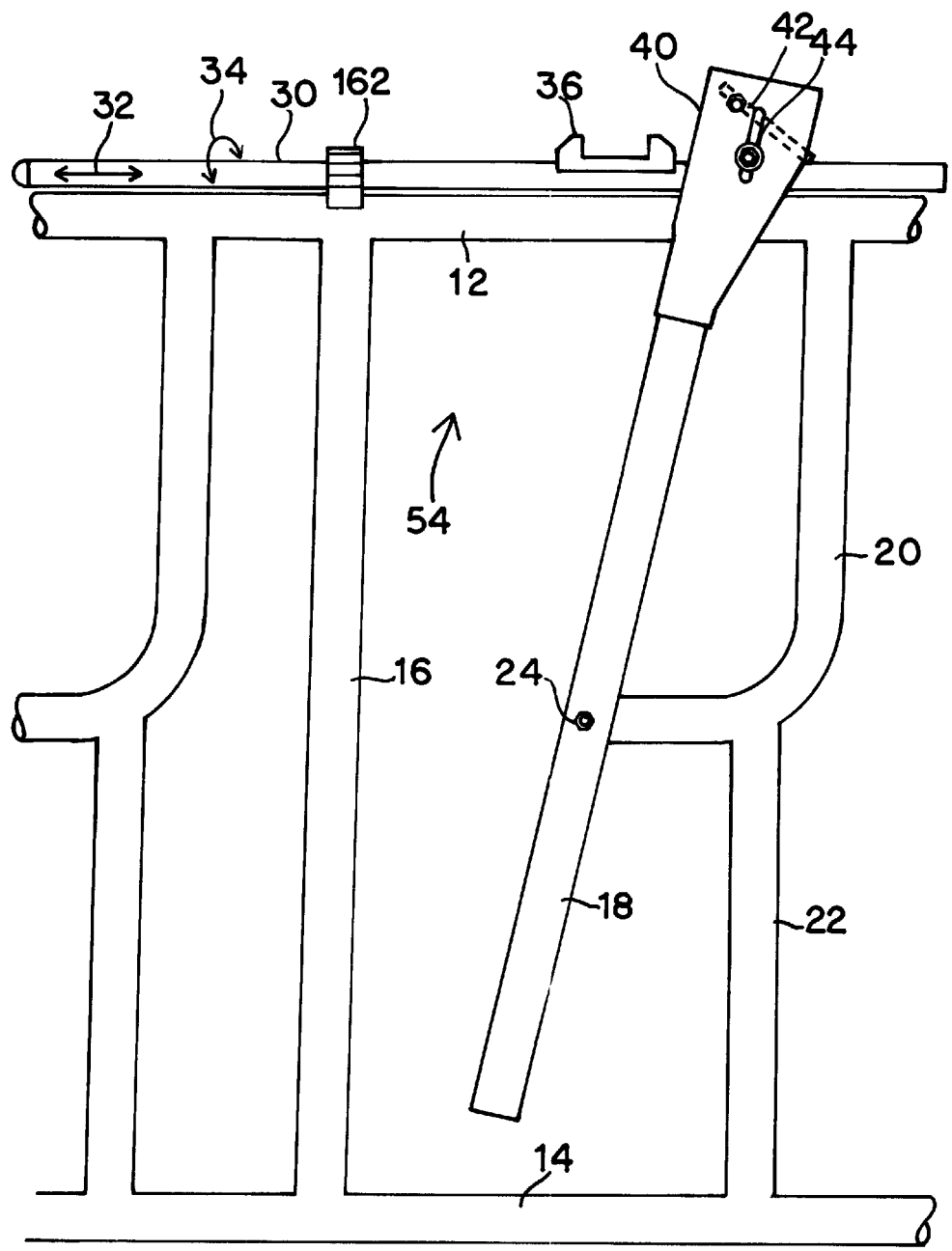
FIG. 1 is a side view of a typical prior art animal stanchion, in the open position and the control arm of the latch mechanism configured to automatically lock the stanchion in the closed position.

There is shown in FIGS. 1 through 4 a typical embodiment of an animal stanchion as one of a string of identical stanchions. Each animal stanchion is formed of generally vertically oriented fixed stanchion 16, pivotal release stanchion 18, fulcrum rail 20 and fulcrum strut 22, which pivotally support release stanchion 18 by means of pivot pin 24. Fixed stanchion 16, fulcrum rail 20 and fulcrum strut 22 are all interconnected between fixed top rail 12 and fixed bottom rail 14.

At the top end of release stanchion 18 there is found a release stanchion collar 40 which is attached to release stanchion 18, and is yoke shaped to fit around top rail 12.

Mounted above top rail 12 by means of slide rail bracket 162 is control rod 30. Control rod 30 is slidable along its longitudinal axis as represented by arrow 32 and rotatable about its longitudinal axis as represented by arrow 34. Top rail 30 also is received within collar 40. Attached to top rail 30 is latch block 36, which, when rotated to the up position, is capable of receiving latch pin 44 and pivotally mounted latch plate 42 held within and mounted to collar 40.

Figure 2:
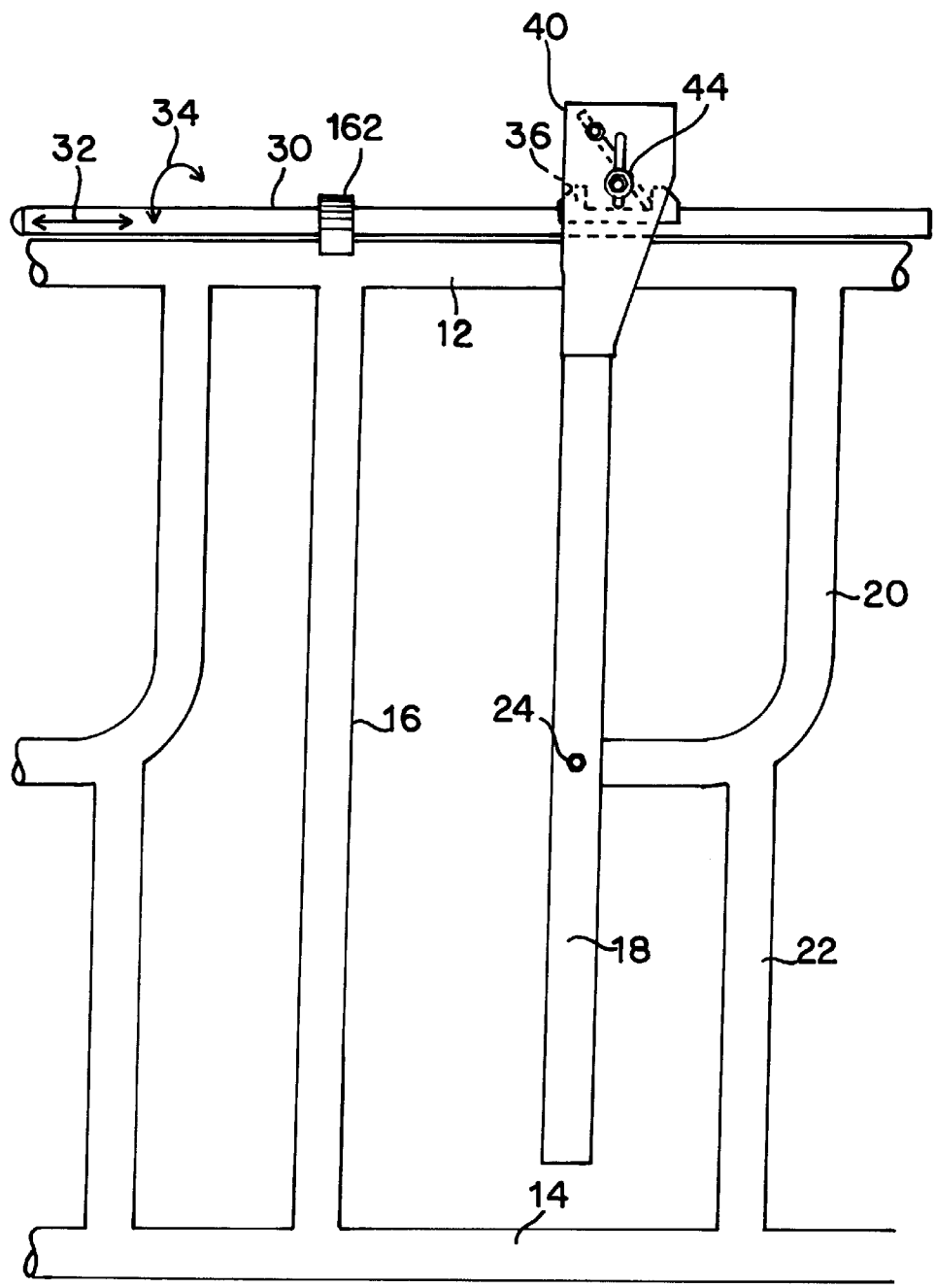
FIG. 2 is a side view of the prior art animal stanchion in the locked and closed position.

In FIG. 1, control rod 30 has been rotated about its longitudinal axis 34 to position latch block 36 in position to receive and hold latch pin 44 and latch plate 42 to lock release stanchion 18 in the closed position and release stanchion 18 is in the open position. This is the automatic lock position. In this position, upper opening 54 is enlarged for purposes of allowing a standing animal to put its head through the upper opening as it approaches the feed bunker (not shown). As the animal lowers its head, it engages the lower portion of release stanchion 18 and swings it about pivot pin 24 to an upright position, as shown in FIG. 2 where latch pin 44 and latch plate 42 become engaged with latch block 36 to lock the stanchion in the closed position. In this position, the opening defined between fixed stanchion 16 and now vertically oriented release stanchion 18 is too small to permit the animal to withdraw its head.

Figure 3:
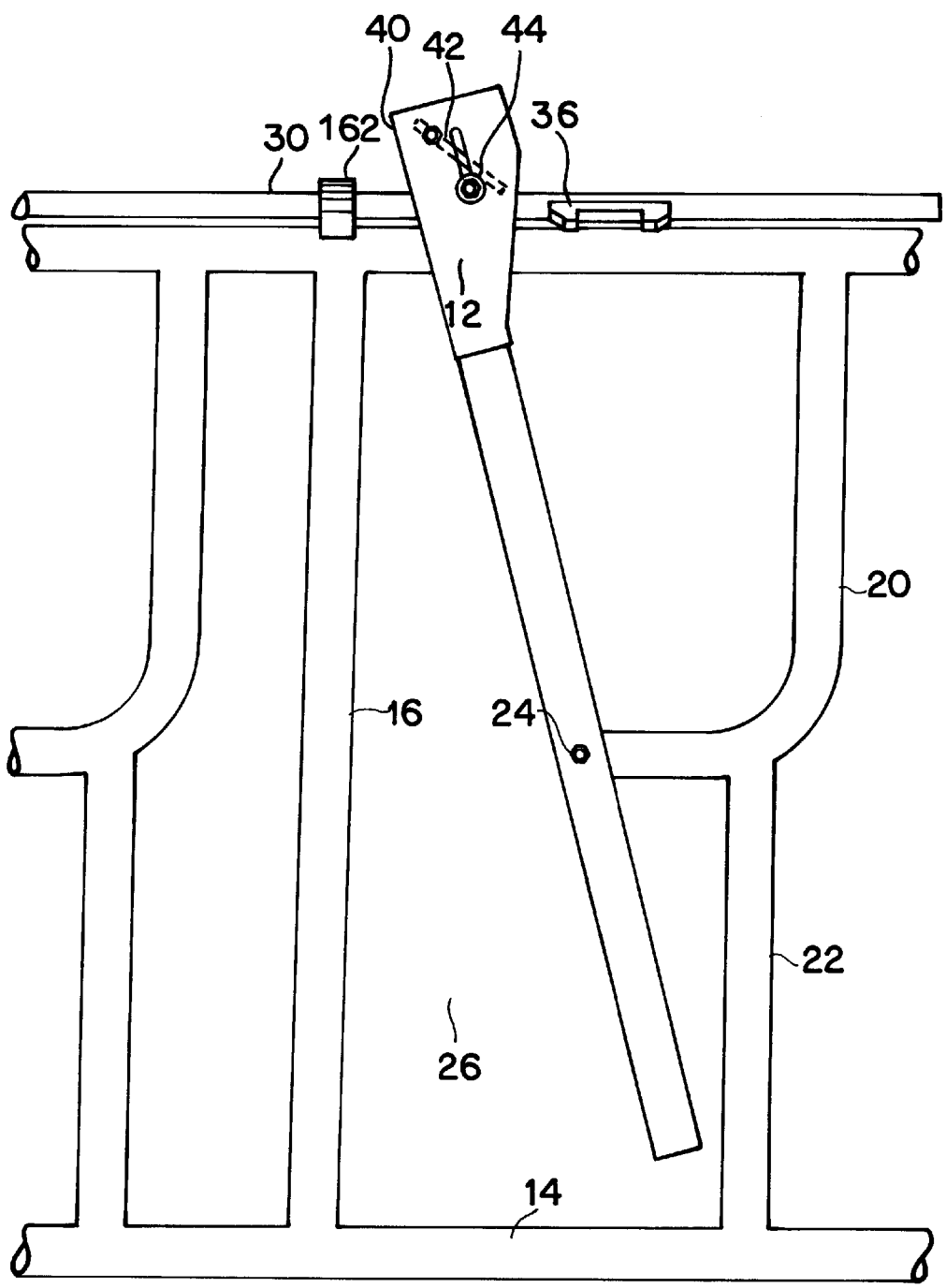
FIG. 3 is a side view of the prior art animal stanchion in the open position with the control arm in the locked open configuration and the pivot arm resting in the downed animal position.

If everything goes as intended, when the operator again rotates control arm 30 in the direction of arrow 34, latch block 36 will rotate to disengage from latch pin 44 and latch plate 42, and allow release stanchion 18 to swing back to the open position. However, in the prior art, and without the use of stanchion bumper 60, an animal could, with its head lowered, knock release stanchion 18 over to its downed animal position, as shown in FIG. 3, and it would stay there until either the animal raised its head and thereby pushed release stanchion 18 back to its open position, or until the operator manually repositioned it in the event that the animal withdrew its head from the enlarged opening 26 in FIG. 3.

Figure 4:
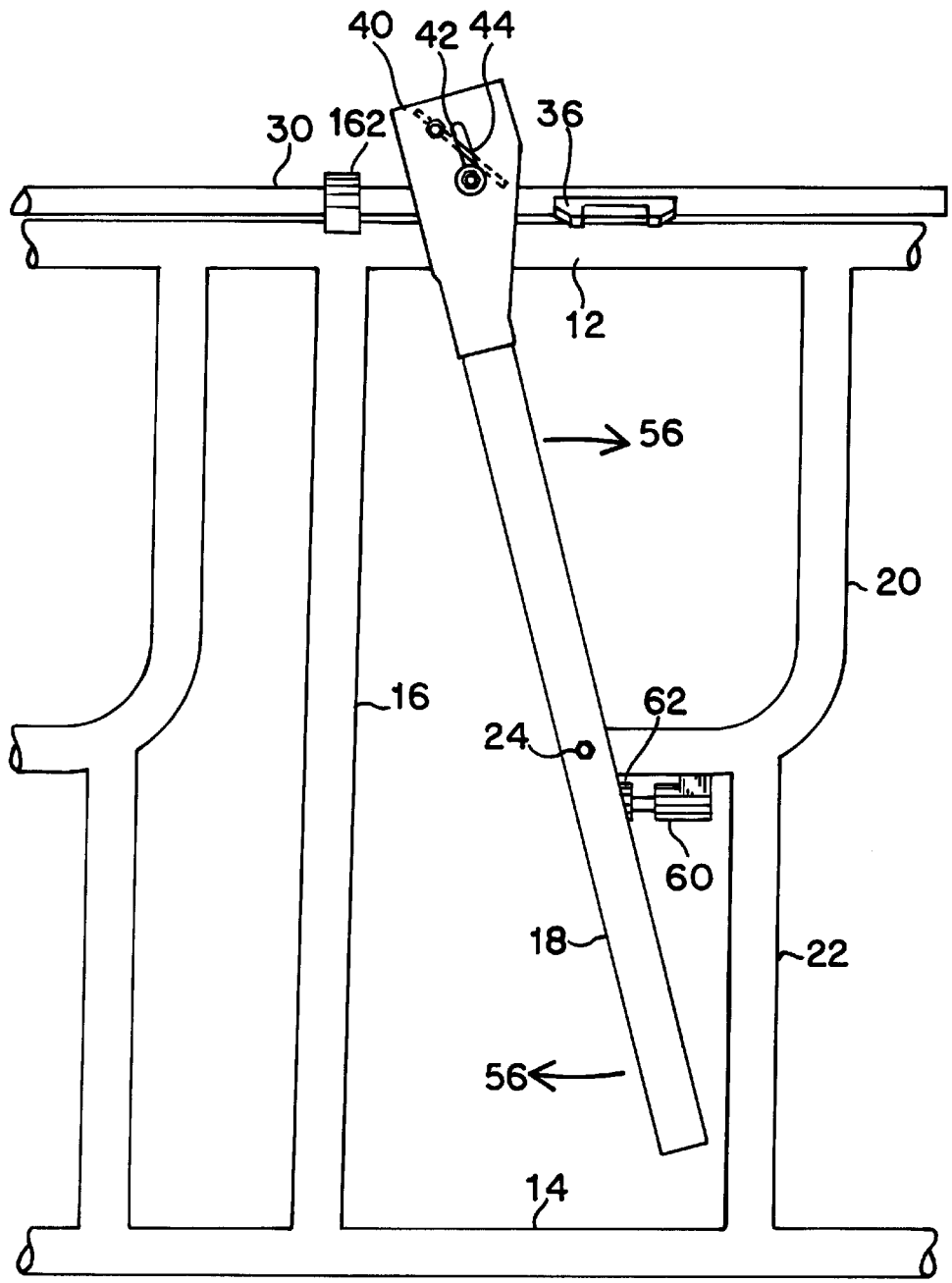
FIG. 4 is a side view of the animal stanchion with the stanchion bumper installed and the pivoting stanchion impacting the stanchion bumper while falling to the downed animal position.

However, as shown in FIG. 4, the use of stanchion bumper 60 prevents this from happening. Instead, when the animal attempts, either intentionally or inadvertently, to push release stanchion 18 over to the downed animal position, release stanchion 18 engages resilient bumper pad 62 of stanchion bumper 60. This results in a recoil force being imparted to release stanchion 18 which rotates it back, as shown by 56, past the closed position at least to a point where it will fall by gravity back to the open position.

Another important feature is that it also keeps pressure against release stanchion 18 when it is just gently pushed by the animal, and therefore holds it much closer to a vertically oriented closed position, thus precluding the animal from withdrawing its head when it is lowered, thus forcing the animal to raise its head to push release stanchion 18 back to the open position before the animal can withdraw. Yet, since stanchion bumper is resilient, an operator can override the force imparted by stanchion bumper 60 to force the release stanchion 18 into the downed animal position to release an animal that has truly fallen.

Figure 5:
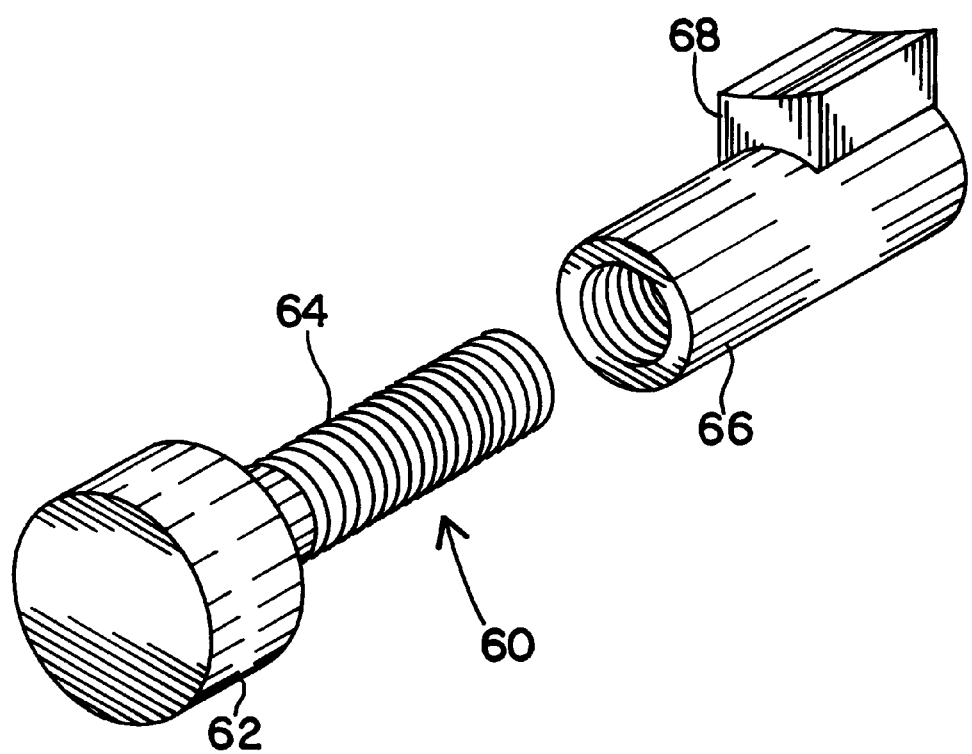
FIG. 5 is an exploded perspective representational view of a first embodiment of a stanchion bumper.

In the preferred embodiment, stanchion bumper 60 is formed, as shown in FIG. 5, of resilient bumper 62, which is molded on to threaded bolt 64. Threaded bolt 64 is threadably and adjustably engageable with elongated receiver nut 66. Bracket 68 is provided for attachment to fulcrum strut 22 in a position where the resilient bumper can be adjusted to just the right distance from release stanchion 18 to insure maximum effectiveness.

Figure 6:
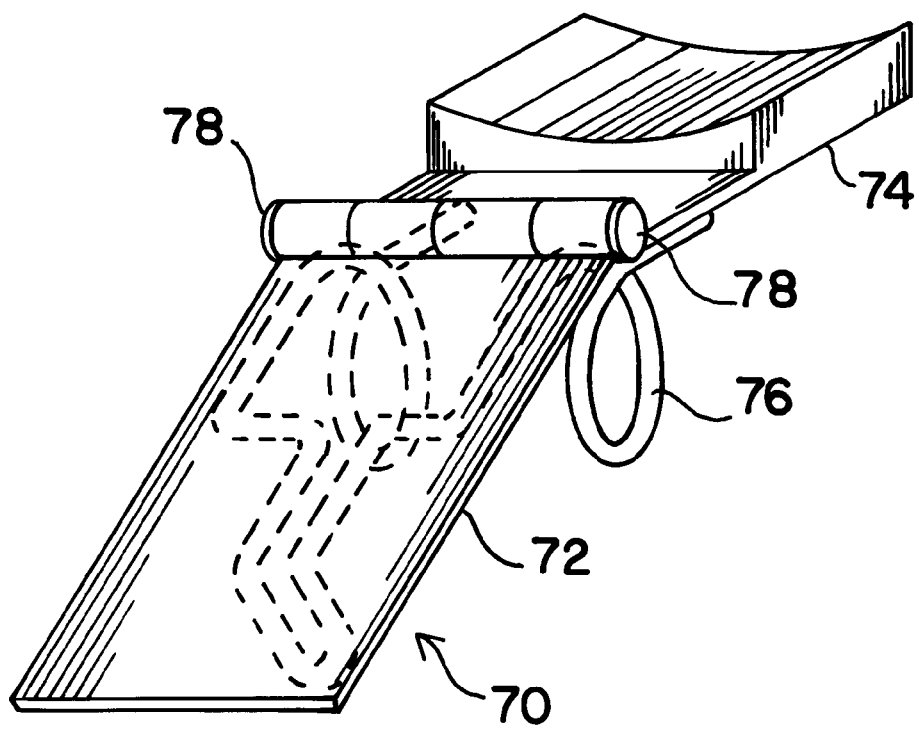
FIG. 6 is a perspective representational view of a second embodiment of a stanchion bumper.

Second embodiment 70 of a stanchion bumper is shown in FIG. 6. In this case, bumper plate 72 is attached by means of hinge 78 to attachment plate 74. The resilient force for bumper plate 72 is provided by means of torsional spring 76. Although this will work, it is not the preferred embodiment, since the environment in which cattle stanchions are used is quite hostile. The mixture of dust, dirt, scraps of feed, animal hair, urine and manure, together with the exposure to extremes of weather conditions, may result in premature failure by jamming or metal fatigue of stanchion bumper 70.

While there is shown and described the present preferred embodiment of the invention, it is to be distinctly understood that this invention is not limited thereto but may be variously embodied to practice within the scope of the following claims.

I claim:

1. In an animal stanchion having fixed and release stanchions laterally spaced apart to define a head opening for an animal, said opening having upper and lower portions, fixed structure including means for mounting said release stanchion for pivotal movement about a pivot point between an open position in which the upper portion of said head opening is enlarged to enable an animal to place its head through said opening, to a closed position in which said upper portion of said opening is narrowed, by the animal lowering its head, to hold the animal's head in said opening, and beyond said closed position to a downed animal position in which the lower portion of said head opening is enlarged to enable an animal to remove its head through the opening in the lower portion, and a latching mechanism which is selectively engageable with said release stanchion for automatically latching said release stanchion when it is pivoted from the open position to the closed position and for disengagement with said release stanchion for allowing said release stanchion to freely pivot from the open position to the closed position, a stanchion bumper which comprises:

a resilient stanchion bumper attached to said mounting means for mounting the release stanchion below the pivot point and positioned for resilient engagement with said release stanchion when said stanchion pivots beyond the closed position;

wherein said stanchion bumper further comprises a bumper plate, an attachment plate for attachment to a fixed structure hinged to said bumper plate, and means for biasing said bumper plate away from said attachment plate.

2. The stanchion bumper of claim 1 wherein said stanchion bumper further comprises a bracket assembly attached to both the bumper and the fixed structure.

3. The stanchion bumper of claim 2 wherein said bracket assembly further comprises means for adjusting a bumper position relative to the release stanchion.

4. The stanchion bumper of claim 1 wherein said stanchion bumper is further configured to produce a recoil force in said release stanchion of sufficient force to pivot said release stanchion about the pivot point to a position from where it will automatically fall to the open position when the animal raises its head.

5. The stanchion bumper of claim 4 wherein said stanchion bumper further comprises a bracket assembly attached to both the bumper and the fixed structure.

6. The stanchion bumper of claim 5 wherein said bracket assembly further comprises means for adjusting the bumper position relative to the release stanchion.

7. The stanchion bumper of claim 4 wherein said stanchion bumper further comprises:

a bracket for attachment to the fixed structure, said bracket having a threaded receiver nut; and a threaded traveler screw attached at one end to said bumper and in threaded engagement with the threaded receiver nut at the other end.

8. The stanchion bumper of claim 4 wherein said stanchion bumper further comprises:

a bumper plate;

an attachment plate for attachment to a fixed structure hinged to said bumper plate; and means for biasing said bumper plate away from said attachment plate.

9. In an animal stanchion having fixed and release stanchions laterally spaced apart to define a head opening for an animal, said opening having upper and lower portions, fixed structure including means for mounting said release stanchion for pivotal movement about a pivot point between an open position in which the upper portion of said head opening is enlarged to enable an animal to place its head through said opening, to a closed position in which said upper portion of said opening is narrowed, by the animal lowering its head, to hold the animal's head in said opening, and beyond said closed position to a downed animal position in which the lower portion of said head opening is enlarged to enable an animal to remove its head through the opening in the lower portion, and a latching mechanism which is selectively engageable with said release stanchion for automatically latching said release stanchion when it is pivoted from the open position to the closed position and for disengagement with said release stanchion for allowing said release stanchion to freely pivot from the open position to the closed position, a stanchion bumper which comprises:

a resilient stanchion bumper attached to said mounting means for mounting the release stanchion below the pivot point and positioned for resilient engagement with said release stanchion when said stanchion pivots beyond the closed position;

wherein said stanchion bumper is further configured to produce a recoil force in said release stanchion of sufficient force to pivot said release stanchion about the pivot point to a position from where it will automatically fall to the open position when the animal raises its head; and wherein said stanchion bumper further comprises: a bracket for attachment to the fixed structure, said bracket having a threaded receiver nut, and a threaded traveler screw attached at one end to said bumper and in threaded engagement with the threaded receiver nut at the other end.

10. In an animal stanchion having fixed and release stanchions laterally spaced apart to define a head opening for an animal, said opening having upper and lower portions, fixed structure including means for mounting said release stanchion for pivotal movement about a pivot point between an open position in which the upper portion of said head opening is enlarged to enable an animal to place its head through said opening, to a closed position in which said upper portion of said opening is narrowed, by the animal lowering its head, to hold the animal's head in said opening, and beyond said closed position to a downed animal position in which the lower portion of said head opening is enlarged to enable an animal to remove its head through the opening in the lower portion, and a latching mechanism which is selectively engageable with said release stanchion for automatically latching said release stanchion when it is pivoted from the open position to the closed position and for disengagement with said release stanchion for allowing said release stanchion to freely pivot from the open position to the closed position, a stanchion bumper which comprises:

a resilient stanchion bumper attached to said mounting means for mounting the release stanchion below the pivot point and positioned for resilient engagement with said release stanchion when said stanchion pivots beyond the closed position;

wherein said stanchion bumper is further configured to produce a recoil force in said release stanchion of sufficient force to pivot said release stanchion about the pivot point to a position from where it will automatically fall to the open position when the animal raises its head; and wherein said stanchion bumper further comprises: a bumper plate; an attachment plate for attachment to a fixed structure hinged to said bumper plate; and means for biasing said bumper plate away from said attachment plate.

11. In an animal stanchion having fixed and release stanchions laterally spaced apart to define a head opening for an animal, said opening having upper and lower portions, fixed structure including means for mounting said release stanchion for pivotal movement about a pivot point between an open position in which the upper portion of said head opening is enlarged to enable an animal to place its head through said opening, to a closed position in which said upper portion of said opening is narrowed, by the animal lowering its head, to hold the animal's head in said opening, and beyond said closed position to a downed animal position in which the lower portion of said head opening is enlarged to enable an animal to remove its head through the opening in the lower portion, and a latching mechanism which is selectively engageable with said release stanchion for automatically latching said release stanchion when it is pivoted from the open position to the closed position and for disengagement with said release stanchion for allowing said release stanchion to freely pivot from the open position to the closed position, a stanchion bumper which comprises:

a resilient stanchion bumper attached to said mounting means for mounting the release stanchion below the pivot point and positioned for resilient engagement with said release stanchion when said stanchion pivots beyond the closed position wherein said stanchion bumper further comprises: a bracket for attachment to the fixed structure, said bracket having a threaded receiver nut; and a threaded traveler screw attached at one end to said bumper and in threaded engagement with the threaded receiver nut at the other end.

* * * * *